A. L. GENTER.
CONTINUOUS THICKENING PROCESS.
APPLICATION FILED SEPT. 12, 1917.

1,263,226.

Patented Apr. 16, 1918.
2 SHEETS—SHEET 1.

Inventor
Albert L. Genter
By T. Walter Fowler
Attorney

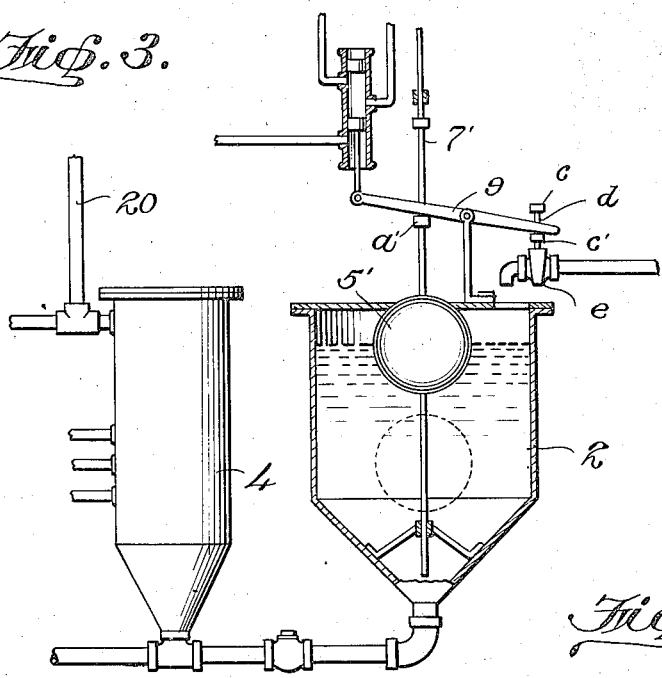
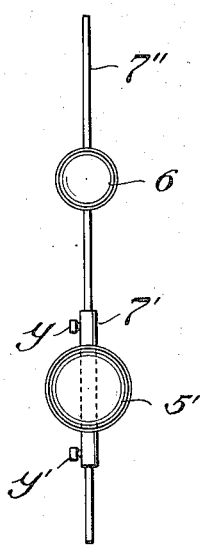

UNITED STATES PATENT OFFICE.

ALBERT LEGRAND GENTER, OF SALT LAKE CITY, UTAH, ASSIGNOR OF ONE-HALF TO THE GENERAL ENGINEERING COMPANY, OF SALT LAKE CITY, UTAH, A CORPORATION OF UTAH.

CONTINUOUS THICKENING PROCESS.

1,263,226.   Specification of Letters Patent.   Patented Apr. 16, 1918.

Application filed September 12, 1917. Serial No. 191,005.

*To all whom it may concern:*

Be it known that I, ALBERT L. GENTER, a citizen of the United States, residing at Salt Lake City, in the county of Salt Lake and State of Utah, have invented certain new and useful Improvements in Continuous Thickening Processes, of which the following is a specification.

My invention relates to a filtering process employing automatic means of shifting a ported valve in a continuous filter or thickener, such as described in my prior Patent No. 1,214,152, dated January 30, 1917, so that positive filtration pressure automatically results on the one hand and a cleansing action on the other in such a manner that during the filtration there is no back pressure on the filtrate outlet and during the cleansing action there is no filtration pressure on the mixture to be filtered.

In my aforesaid Patent No. 1,214,152, I have shown means of cleansing the filter medium *in situ* by the action of alternately directing in substantially rapid succession the filter current against one side of the filter medium, and a cleansing current against the opposite side of said medium. Although the process of cleansing the medium *in situ* is broadly substantially the same in my present invention as in the patent referred to, it is not necessary in the present instance to produce this cleansing action in rapid succession with the filtering action desired. In other words, the present arrangement is entirely automatic and flexible, so that the rhythmic pulsating action can be altered from a rapid to a slow movement as desired.

In my aforesaid prior Patent No. 1,214,152, and my pending application, Serial Number 143,935, this rotating or shifting of the ported member connecting the filtrate at one time with the atmosphere and then with the back pressure means is mechanically performed through some outside force, such as a pulley, belt, and the like. My present invention combines the process of alternately directing the filter current against the opposite side of said medium, as well as automatically producing and releasing the filtration and back pressure with a switching mechanism that is operated by the rise and fall of the mixture to be filtered, or by the quantity of filtrate and the pressure means used to force the filtrate through the medium or cleanse the intercepted solids from the medium.

In the accompanying drawings forming part of this specification, I illustrate several forms of apparatus by which my process may be automatically carried out. But the invention is not restricted to such apparatus or in fact to any particular type of apparatus, as it is obvious that I may resort to a variety of mechanical constructions and arrangements of parts to obtain the desired results, as hereinafter specified.

Fig. 3 shows a further means of automatically actuating the switching mechanism.

Fig. 4 shows an electrical means of obtaining the same ends.

Fig. 5 shows a double float with telescoping stem.

In the practical use of the invention covered in my Letters Patent No. 1,214,152, and pending application No. 143,935, it has been determined that if the filtration pressure is released at the time the back pressure cleansing action takes place, that the filter medium is cleansed much more efficiently in a shorter time than would be the case if the filtration pressure were maintained and a higher back cleansing pressure were applied. As this cleansing action occurs at a lower pressure and against practically no pressure within the filter chamber, it will be seen that less power is required for the operation.

Provision is also made in the present invention for continually discharging the sediment cleansed from the leaves from the filter chamber. As this discharge can be regulated at will, the apparatus becomes not only a continuous filter but also a continuous thickener of the material being filtered, thus providing positive clean filtrate and a continuous discharge of material thickened to any desired degree in a very small space and without centrifugal or piston pumps and other expensive decantation tanks and driving mechanism.

In the following description, one filter chamber is shown in detail. A series of these chambers together with filter elements may be so connected to one or more actuating mechanism that any desired capacity may result. It is also obvious that the chambers may be so connected that the discharge of thickened material is made from individual cells or chambers, or the cells are connected to one discharge outlet in series more fully described in my pending application Serial Number 143,935.

Figure 1:
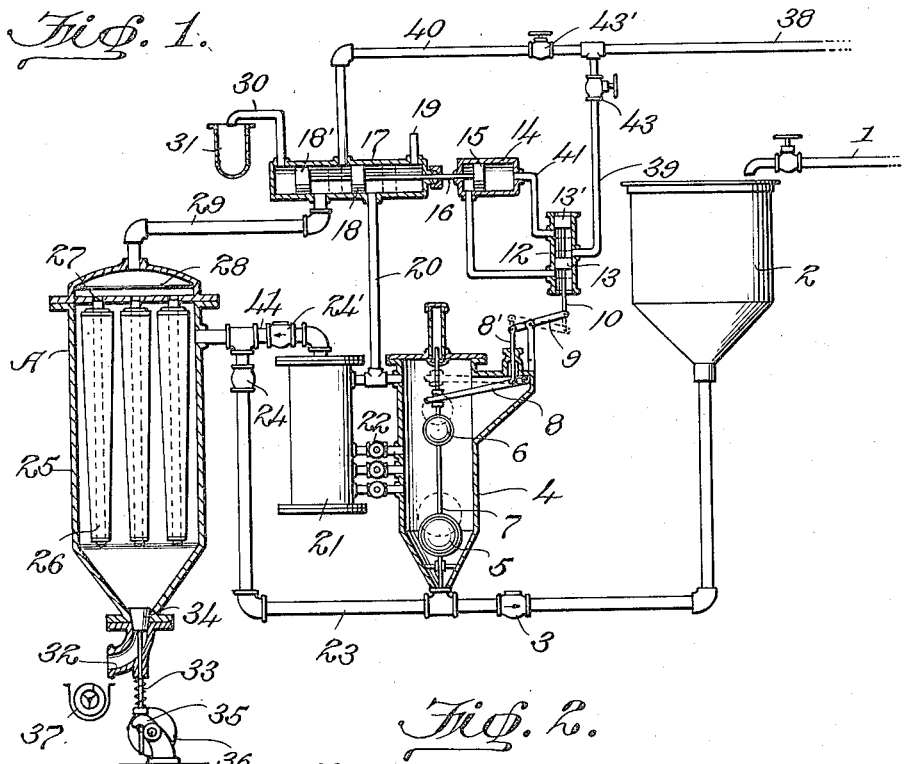
Figure 1 is a diagrammatical sectional view and part elevation of a filter cell having filter elements and outlets and a controlling member with the automatically actuated switching mechanism, embodying the salient features of my invention.

Referring to the type of apparatus illustrated in Fig. 1, and which shows one embodiment of filtering apparatus for carrying out the present process, 1 is a source of supply of the material to be filtered; 2 is a storage tank of any suitable character having a delivery pipe with a check valve, 3, said pipe connected at the bottom with a chamber, 4, in which are properly guided floats, 5 and 6, of different sizes, said floats being secured to a stem or rod, 7, having collars or stops between which passes the free end of a pivoted lever, 8, to which is connected a rod, 8', that is pivotally attached to one end of the rocking lever, 9, the other end of this lever being connected to a piston rod, 10, having pistons, 13 and 13' operating in a casing or housing, 12. This housing is connected by a pipe, 41, with one end of a chamber or casing 14, in which operates a piston, 15, having a stem, 16, extending into another chamber or casing, 17, and provided with pistons, 18 and 18', said housing or casing, 17, connecting with pipes, 19 and 20, the latter in turn being connected to the upper end of the chambers 4 and 21, said chambers being connected at varying levels by valve controlled pipes, 22, and the pipe, 23, from the chamber or casing, 4, said pipe provided with a check valve, 24, and connecting with a pipe having a branch, 44, leading into the top of the chamber, 21, and provided with a check valve, 24', and having another branch connecting with the upper portion of the chamber, 25, which may be regarded as the filter chamber and in which chamber, suitable filtering agents, 26, may be properly positioned, these filtering agents being of any well known type and having filtrate outlets, 27, connecting with a chamber, 28, in the upper portion of the casing, said chamber having a pipe, 29, leading therefrom and connecting with the casing or housing, 17, said casing or housing having at one end a pipe, 30, for delivering filtrate into a trough, 31, or equivalent receiver.

The filtrate chamber, 25, has an outlet, 32, for solids and in this outlet operates a valve stem, 33, carrying a spring actuated valve, 34, the lower end of the stem being operated by a tappet or cam, 35, and a shaft operated by a pulley, 36, or like driver. The solids delivered from the filtrate casing are received into a trough or casing in which operates a suitable conveyer, 37.

In the apparatus shown in Fig. 1, the whole device is supposed to be empty. The material to be filtered flows by gravity from the storage tank, 2, through pipe, 23, and due to the gravity head, it flows through the check valve, 3, into float chamber, 4, the air in chamber, 4, being forced out through pipe, 20, and through the switch valve, 17, to the right of piston, 18, and thence through the exhaust pipe, 19. As soon as the float, 5, is submerged, the weight of the upper float, 6, and the float rod, 7, is counter-balanced. The two floats are of such size that there is no positive lift until the upper float is partially submerged, nor will the floats fall until the lower float is out of submergence. This permits the chambers 4 and 21, to practically fill and empty before the floats actuate the balance of the mechanism.

While the liquid to be filtered is flowing into the chambers, 4 and 21, compressed air is being admitted to the switching and pipe system through the pipe, 38. If the valves, 43 and 43', are opened, the compressed air flows into the pilot valve, 12, through the pipe, 39, then between the pistons, 13 and 13', through the pipe, 41, and back of the piston, 15, forcing this piston into the full line position. The result of this is that the pistons, 18 and 18', are forced into the full line position shown. Compressed air then enters between pistons, 18 and 18', through the pipe, 40, and passes on through the pipe, 29, to the filtrate chamber and thence to the interior of filter elements, 26 and 26', through the pipes, 27.

When the upper float, 6, is sufficiently submerged, it lifts and thus actuates the levers, 8 and 9, and the rods, 8' and 10, pulling down the pilot-valve pistons, 13 and 13', to the dotted position. This permits compressed air to flow through the pipes, 39 and 42, to the left side of the piston, 15, thus forcing this piston to the dotted position so that the air on its right side exhausts through the pipe, 41, and the housing, 12, to the atmosphere above the piston, 13'. This switching action throws the main switching pistons, 18 and 18', into their dotted positions, thus connecting the compressed air-line, 40, with the chamber, 17, and pipe, 20, leading to the chambers, 4 and 21, and the filtrate pipe, 29, with the outlet pipe, 30. The air in the filter elements, 26 and in the filtrate chamber, A, escapes to the atmosphere through the pipes, 29 and 30. The compressed air from the pipe, 40, being of sufficient positive pressure, flows through the pipe, 20, exerting its force on the unfiltered mixture, in the chambers, 4 and 21. This air-pressure being greater than the gravity head from the tank, 2, closes the check-valves, 3 and 24', in directions shown by arrows and forces the mixture into the filter chamber, 25, through the pipe, 23, and check-valve, 24.

As soon as liquid is forced from the chambers, 4 and 21, so that the lower float, 5, drops, the levers, 8 and 9, and the rods, 8' and 10, again force the pilot-valve into positions shown in full lines on Fig. 1, and the float-chamber is again connected to the atmosphere through the pipes, 20 and 19, and material automatically flows into the chamber, 4, through the check-valve, 3 from the storage source, 2, until the upper float lifts and reverses the entire mechanism, thus admitting compressed air again to the chambers, 4, and 21, and forcing the material into the filter chamber, 25. This pumping action automatically continues until the chamber, 25, is full of mixture to be filtered. Then as the liquid has to be forced through the filter medium on elements 26, the pumping action automatically slows up and the discharge mechanism, 33, 34, 35, and 36, may be started. When the filter chamber, 25, is full and the mechanism is in dotted position, the compressed air enters the chambers, 4 and 21, through the pipes 40 and 20, closing the check valves, 3 and 24', as already described, and exerts its entire force on the liquid in the chamber and pipe system, thus forcing the filtrate through the filter elements, 26, and through the pipes, 27, into the common filtrate chamber, A, and through the pipe, 29, housing, 17, to the left of dotted piston, 18', and out through the pipe, 30, to the collecting launder, 31.

As filtration proceeds, the intercepted solids are held on the filter elements, 26, and the liquid level in the chambers, 4, and 21, drops in proportion to the outflow of filtrate through the discharge pipe, 30, until the lower float, 5, actuates the mechanism as previously described. At this stage, the compressed air imprisoned in the chambers, 4 and 21, escapes through the pipes 20 and 19, to the atmosphere, permitting a new supply for the chambers, 4 and 21, to flow from the tank, 2. In the meantime, compressed air in the pipe, 40, is connected with the filtrate column in the pipe, 29, chamber, A, and interior of the filter elements, 26, thus exerting the pulsating or back pressure shock described in my previous patent and application, against the sediment on the filter elements, 26, and dislodging this sediment, which falls to the bottom of the chamber, 25. As this chamber, 25, is connected to the chamber, 21, by means of the pipe, 44, and the check-valve, 24', and this in turn is connected to the atmosphere through the pipes, 20 and 19, there will be no pressure within the chamber, 25, to hinder the back-pressure-cleansing action other than the pressure exerted on the liquid within the chamber 25, by expansion of the flexible filter-medium, 26, and its internal back-pressure coming from filtrate column in chamber, A, and pipe, 29, and air pressure from the pipe, 40. This pressure closes the check-valve, 24, so no unfiltered mixtures may be forced back into the chamber, 4, from the chamber, 25, while the chamber, 4, is filling from the tank, 2. At the same time this back-pressure opens the check-valve, 24', and if this back-pressure is of a few seconds' duration, the expansibility of mediums on the filter agents, 26, together with the small amount of filtrate that is forced back through the medium into the chamber, 25, during the back-pressure-cleansing action, will cause a displacement of a certain excess of unfiltered material in the chamber, 25, after the discharge of the sediment. This displaced excess from the chamber, 25, flows through the pipes, 44, and check-valve, 24', into the chamber, 21, so it does not hinder the cleansing action in the filter, 25, nor the filling action in the chamber, 4.

In the meantime, the floats, 5 and 6, again lift, thus connecting the chambers, 4 and 21, with the compressed air and filtrate pipe, 29, with the outlet pipe, 30, and collecting launder, 31. The filter medium on elements, 26, being cleansed, filtration begins anew with the original rate of outflow.

The solids cleansed or pulsated from the filter elements 26 naturally fall to the bottom of the chamber, 25. In the bottom of this chamber is the outlet connection, 32, containing a mechanically-actuated plug-valve, 34, with its stem, 33. If a cam, 35, be revolved by pulley or gear, 36, plug 34 will be periodically opened, thus permitting, during these periods of opening, the pressure within the chamber, 25, to force the thickened sediment collected in the bottom of the chamber out through the outlet, 32. As the pulley, 36, can be revolved at different speeds and the lifting distance of the valve, 34, regulated by a stop on the stem, 33, so that the lift due to the stem, 35, will be large or small, it will be seen that this discharge plug-valve can be run continuously with a large or a small opening, thus permitting any desired degree of thickened material to be discharged through the outlet 32 out into the collecting hopper, 37.

It will thus be seen that the float-chamber, 4, not only becomes a positive air-pump for forcing the filtrate through the filter elements, 26, but due to the rise and fall of the floats in said chamber, automatic means are provided for intermittently switching the pistons, 12, 13', 15, 18, and 18', so that the float-chamber can refill while intercepted solids or sediment on the filter elements can be continuously discharged from these elements and collected at will outside of the system. Thus, there is no necessity of ever opening the filtering chamber except for replacing the medium on the elements, 26, which has become clogged or worn out through long usage. Consequently, the only manual labor ever necessary with this device will be for the purpose of replacing worn out elements.

As the chamber, 21, merely has the function of serving as a reservoir for the excess displaced from the filtering chamber 25 during the back-pressure-cleansing period and this excess will vary in quantity with the time of the back-pressure period and the expansibility of the medium on the elements, 26, it will be seen by referring to the valves, 22 and 22', between the chambers, 4 and 21, that the amount of displaced excess that flows from the chamber, 21, to the chamber 4, together with amount of mixture that flows into the chambers 4 and 21, during each filling period can be regulated through the closing or opening valves, 22 and 22'. For instance, if the lower two valves, 22', are closed and the upper valve, 22, opened, the compressed-air entering through the pipe, 20, will only force unfiltered mixture from chamber 21, to chamber 4, equal to the amount of mixture that exists in chamber, 21, above the level of the connection, 22. This amount, together with the displaced excess during the filtration period goes back into the main filter chamber, 25, with the full amount in the chamber, 24, and will be less than if the lower valve, 22', were opened. This permits making the filtration period somewhat shorter than would be the case if the entire contents of the chamber, 21, had to be forced with the contents of the chamber, 24, through the filter mediums 26. As a consequence of this, the filtration period will be shorter and the stroke of floats, 5 and 6, will be oftener and the back-pressure-cleansing period will occur oftener. This may be necessary on some materials.

Furthermore, in order to regulate the frequency of the stroke of the floats, 5 and 6, and the filtration and consequently the back-pressure periods, one or both of the floats, 5 and 6, may be slidably mounted on rod, 7, (see Fig. 5), so that they can be placed closer together or farther apart than is shown in Fig. 1. This is another provision for flexibility in the actuating mechanism and may be necessary in filtering some materials that easily clog the pores of the filter medium, 26, so that a frequent back-pressure is necessary in order to keep the filtrate output to its maximum. In Fig. 5, the float, 5', is built over a tube, 7', through which the rod, 7'' telescopes and is held in any desired place by means of set screws $y$ and $y'$.

Figure 2:
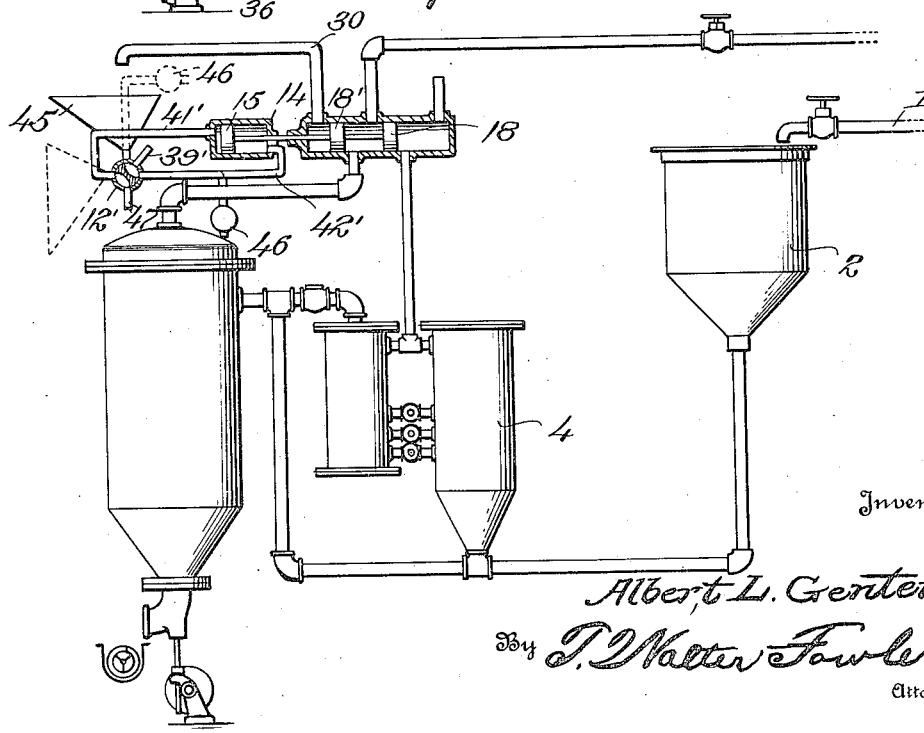
Fig. 2 is the same, showing another means of automatically actuating the switching mechanism.

In order to do away with the float mechanism in the chamber 4, another means of actuating the pistons, 15, 18 and 18', is shown in Fig. 2. Here the filtrate from the delivery pipe, 30, flows into a tipple box, 45. This is pivoted on a switch-valve, 12', and counter-balanced by a weight, 46. A four-way valve, 12' is connected to the high pressure air-line, 39', at the top, and two pipes, 41' and 42', lead to the actuating valve-casing, 14, and the exhaust, 47. In the full-line position shown in Fig. 2, the tipple box, 45, is empty. As soon as it becomes filled with filtrate from the filtrate outlet, 30, the center of gravity of the filtrate in this box being to the left of the pivot on the valve, 12', causes the full weight of the box 45, to fall over into the dotted position, thus switching the four-way valve, 12', so that the piston, 15, is switched together with pistons, 18 and 18', thus causing back-pressure within the filter elements, 26, and the exhaust from chambers, 4 and 21, as previously described. As soon as the tipple box, 45, is sufficiently empty, the counterweight, 46, pulls it back into its upright position, thus again switching pistons, 15, 18, and 18', so that compressed air enters the chambers, 4 and 21, and filtrate is forced from the pipe, 30.

With the arrangement shown in Fig. 2, the supply tank, 2, must be located sufficiently above the entire chamber arrangement in order to fill all chambers at the start and cause filtrate to flow out through the pipe, 30, before the automatic action starts. This, of course, is not necessary in the system shown in Fig. 1.

A further arrangement for carrying out my method may be by disposing the actuating float mechanism in an open tank as shown in Fig. 3. The advantage of this arrangement lies in the fact that the action of the float may be more easily watched. In this arrangement, the float, 5', with its actuating stem, 7' is located in the supply tank, 2, shown in the other figures. The mixture to be filtered is continuously or automatically fed to the tank through the pipe, 1, as shown in the other figures. Here the action of the float, 5', is the reverse of the action of the floats, 5 and 6, in Fig. 1. In other words, the lift of the float actuates the reversing mechanism when the chambers, 4 and 21, are empty. That is, while chambers, 4 and 21, are being emptied by filtration pressure exerted through the connections, 40 and 20, material is flowing into the supply tank, 2, at such speed that when this tank is full and has lifted the float so that a stop, $a'$, comes in contact with a lever, 9', thus lifting it and actuating the switching-valves as already described, the imprisoned air in the chambers, 4 and 21, (Fig. 1) may escape through the pipes, 20 and 19, and the back-pressure-cleansing effect takes place through the pipes, 40 and 29 (Fig. 1). The gravity head between the supply tanks, 2 and 4, and 21, being sufficient to open check-valve, 3, the supply in the tank, 2, now flows into the chambers, 4 and 21, until the float, 5', drops to the dotted position (Fig. 3), again reversing the switching-valve through the stop, a, coming in contact with the lever, 9', on its down stroke. In order to prevent any material flowing into the supply tank, 2, when the float is in its highest position, one end of the lever, 9', is extended so it comes in contact with the stops, c and c', on the valve stem, d, of the gate-valve, e. This closes the valve which is not again opened until the float drops and the end of the lever, 9', lifts the valve-stem, d, through coming in contact with the stop, c.

In Fig. 4, a further means of actuating the main switch valve is shown. Here the float, 5", with its rod, 7", and stops, a and a', switches the spring switch, b and b' so that the two poles of an electric-circuit are closed or broken through the stop, c. In closing this circuit, an electro-magnet, d and d", with connected plungers e and e', of the solenoid, ironclad-solenoid, or plunger electro-magnet type is made to pull the pilot pistons, 13 and 13', (see Fig. 1) into the positions desired.

In fact, in carrying out my process, numerous float and weight arrangements for actuating the switching-valve may be resorted to, as is shown in the descriptions already made. As long as the buoyancy of the material being filtered or the weight of the filtrate or the weight of either the filtrate or the material being filtered is used to actuate floats or such arrangements as tipple boxes, meters, etc., I regard all employments of such actions as within the scope of my present invention.

Having thus described my invention what I claim as new and desire to secure by Letters Patent is:—

1. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure.

2. The process substantially as herein described, of continuously filtering and thickening the mixture being filtered under positive pressure, said process consisting, essentially, in automatically and continuously cleansing a filter medium *in situ* in a filter chamber, by alterately directing in any desired succession the filter current against one side of said filter medium simultaneously with the release of positive pressure on the filtrate side, and a cleansing current against the opposite side of said medium simultaneously with the release of positive filtration pressure, by utilizing the buoyancy or resultant upward pressure of the material being filtered on an immersed floating body and thereby actuating switching mechanisms connecting with the energy supply for filtration pressure and cleansing.

3. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure, and utilizing the energy of the unfiltered mixture to actuate switching mechanism which controls said mixture and the cleansing current.

4. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure, by utilizing the buoyancy of the mixture to be filtered to actuate switching mechanism so that pressure is automatically maintained on the mixture during filtration.

5. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure, and utilizing the buoyancy of the mixture to be filtered to actuate switching mechanism so that the cleansing current is automatically maintained under pressure on one side of the filter medium during the period of filling a storage receiver for a succeeding filtration period.

6. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure, utilizing the energy of the unfiltered mixture to actuate switching mechanism which controls said mixture and the cleansing current, and utilizing the buoyancy of the mixture to be filtered to actuate switching mechanism so that the cleansing current is automatically maintained under pressure on one side of the filter medium during the period of emptying one storage receiver and filling another for a following filtration period.

7. The process substantially as herein described, of continuously filtering and thickening the mixture being filtered under positive pressure, said process consisting, essentially, in automatically and continuously cleansing a filter medium *in situ* in a filter chamber, by alternately directing in any desired succession the filter current against one side of said filter medium simultaneously with the release of positive pressure on the filtrate side, and a cleansing current against the opposite side of said medium simultaneously with the release of the positive filtration pressure, and utilizing the buoyancy of the mixture to be filtered to actuate switching mechanism so that pressure is automatically maintained on the mixture during the emptying of an actuating float chamber.

In testimony whereof I affix my signature.

ALBERT LEGRAND GENTER.